US012674524B2

(12) United States Patent　　　　(10) Patent No.:　US 12,674,524 B2
Hodapp et al.　　　　　　　　　　　 (45) Date of Patent:　　　Jul. 7, 2026

(54) VACUUM VALVE

(71) Applicant: PFEIFFER VACUUM TECHNOLOGY AG, Asslar (DE)

(72) Inventors: Thomas R. Hodapp, Sacramento, CA (US); Sean A. Casarotti, Yreka, CA (US); David W. Crone, Mountain View, CA (US)

(73) Assignee: PFEIFFER VACUUM TECHNOLOGY AG, Asslar (DE)

( * ) Notice: Subject to any disclaimer, the term of this patent is extended or adjusted under 35 U.S.C. 154(b) by 1 day.

(21) Appl. No.: 18/883,203

(22) Filed: Sep. 12, 2024

(65) Prior Publication Data

US 2025/0003525 A1　　　Jan. 2, 2025

Related U.S. Application Data

(63) Continuation of application No. 17/690,470, filed on Mar. 9, 2022, now Pat. No. 12,104,715.

(51) Int. Cl.
　　*F16K 51/02*　　　　(2006.01)
　　*F16K 1/36*　　　　 (2006.01)
　　　　　　(Continued)

(52) U.S. Cl.
　　CPC ............... *F16K 51/02* (2013.01); *F16K 1/36* (2013.01); *F16K 1/54* (2013.01); *F16K 31/047* (2013.01)

(58) Field of Classification Search
　　CPC ... F16K 51/02; F16K 1/36; F16K 1/54; F16K 31/047
　　See application file for complete search history.

(56) References Cited

U.S. PATENT DOCUMENTS 4,099,704 A　　7/1978　Okumura et al.
5,318,272 A　　6/1994　Smith
　　　　　　(Continued)

FOREIGN PATENT DOCUMENTS

CN　　103968082 A　　8/2014
CN　　205026116 U　　2/2016
　　　　　　(Continued)

OTHER PUBLICATIONS

Partial European Search Report issued on Oct. 17, 2022, in European Patent Application No. 22169276.7.
　　　　　　(Continued)

*Primary Examiner* — Eric Keasel
(74) *Attorney, Agent, or Firm* — Oblon, McClelland, Maier & Neustadt, L.L.P.

(57)　　　　　　ABSTRACT

A vacuum valve for high/ultra-high vacuum systems includes a valve housing defining a passage connecting a first and a second opening of the housing. A valve body and a complementary seat is disposed in the passage, the valve body and/or the seat including a seal and the valve body being movable in a linear axial direction along between an open position and a closed position. The valve body cooperates with the seat in the closed position so as to close the first opening gas-tightly. An electromechanical actuation unit for actuating the valve body includes an electric motor and a mechanical conversion unit with an input portion drivingly connected to the motor and an output portion drivingly connected to the valve body. The conversion unit converts a rotational output of the electrical motor into a linear movement of an output portion to move the valve body in the axial direction.

4 Claims, 10 Drawing Sheets

(51) Int. Cl.
  *F16K 1/54*  (2006.01)
  *F16K 31/04*  (2006.01)

(56)  References Cited

U.S. PATENT DOCUMENTS

| | | | |
|---|---|---|---|
| 6,491,059 B2 | 12/2002 | Kajitani | |
| 7,070,159 B2 | 7/2006 | Kajitani | |
| 9,702,479 B2 * | 7/2017 | Nakamura | .............. F16K 31/53 |
| 10,539,250 B2 | 1/2020 | Mahajan | |
| 11,112,029 B2 * | 9/2021 | Eschenmoser | ............ G01L 1/22 |
| 2002/0033462 A1 | 3/2002 | Kajitani | |
| 2002/0134441 A1 | 9/2002 | Kusumoto | |
| 2014/0374637 A1 | 12/2014 | Nakamura et al. | |
| 2015/0285382 A1 | 10/2015 | Kienreich et al. | |
| 2019/0316703 A1 | 10/2019 | Dohi et al. | |

FOREIGN PATENT DOCUMENTS

| | | | |
|---|---|---|---|
| CN | 207975304 U | 10/2018 | |
| CN | 111022733 A | 4/2020 | |
| JP | 25-8170 Y | 10/1950 | |
| JP | 49-15291 Y | 4/1974 | |
| JP | 52-80517 A | 7/1977 | |
| JP | 6-50444 A | 2/1994 | |
| JP | 6-288493 A | 10/1994 | |
| JP | 2003-90457 A | 3/2003 | |
| JP | 2003-194250 A | 7/2003 | |
| JP | 2004-340344 A | 12/2004 | |
| JP | 2011-134164 A | 7/2011 | |
| JP | 2013-231461 A | 11/2013 | |
| JP | 2015-197221 A | 11/2015 | |
| JP | 2016-134390 A | 7/2016 | |
| JP | 2016-138641 A | 8/2016 | |
| JP | 2020-51447 A | 4/2020 | |
| JP | 2021-71129 A | 5/2021 | |
| WO | WO 93/25832 A1 | 12/1993 | |
| WO | WO 2010/084618 A1 | 7/2010 | |
| WO | WO 2018/079586 A1 | 5/2018 | |

OTHER PUBLICATIONS

Extended European Search Report issued Jan. 18, 2023, in European Patent Application No. 22169276.7.

VAT Installation, Operating & Maintenance Instructions; Series 264, DN25-40; VAT Vacuumventile AG, CH-9469 Haag, Switzerland; 277387EF, pp. 1-10; Oct. 6, 2010.

Combined Chinese Office Action and Search Report issued in corresponding Chinese Patent Application No. (with English Translation and English Translation of Category of Cited Documents), 17 pages.

English translation of Japanese Office Action issued Jan. 7, 2026 in Japanese Patent Application No. 2024-213041, 4 pages.

* cited by examiner

VACUUM VALVE

CROSS-REFERENCE TO RELATED APPLICATION

This application is a continuation of and claims benefit under 35 U.S.C. § 120 to U.S. Pat. No. 17,690,470, filed Mar. 9, 2022, the entire contents of which are incorporated herein by reference.

FIELD OF THE INVENTION

The present invention relates to a vacuum valve for medium, high or ultra-high vacuum systems. A further aspect of the present invention relates to a method for operating a vacuum valve.

BACKGROUND OF THE INVENTION

Medium-, high- and ultra-high vacuum systems are in use in many technological fields and industrial or scientific applications. Such vacuums, which are in particular in the range of 100 to 10-9 Pa, set very high requirements to the design of the components used in such systems. In particular, valves of such systems must meet high standards as they have to be able to reliably prevent gas leakage when in a closed condition.

Conventional vacuum valves are based on pneumatic or solenoid actuators. Although such valves are in general reliable, a considerable amount of energy is needed to actuate them and/or to hold them in an open or closed position. Energy efficiency, however, is an increasingly important issue due to e.g., environmental and cost considerations.

It is therefore an object of the present invention to provide a more energy efficient vacuum valve that can be operated reliably.

SUMMARY OF THE INVENTION

According to a first aspect of the present invention a vacuum valve for medium-, high- or ultra-high vacuum systems is provided, the vacuum valve comprising a valve housing defining a passage connecting a first and a second opening of the valve housing, a valve body and a complementary seat disposed in the passage, the valve body and/or the seat comprising a seal member and the valve body being movable in a linear axial direction between an open position and a closed position, wherein the valve body cooperates with the seat in the closed position so as to close the first opening gas-tightly, and an electromechanical actuation unit for actuating the valve body, the actuation unit comprising an electric motor and a mechanical conversion unit with an input portion drivingly connected with the electric motor and an output portion drivingly connected with the valve body, wherein the mechanical conversion unit converts a rotational output of the electrical motor into a linear movement of the output portion to move the valve body in the axial direction.

Such an electromechanical actuation unit can be very compact and allows to convert the electric energy input efficiently into an actuation movement of the valve body. Since the energy consumption of the vacuum valve according to the present invention is comparatively low, it is not necessarily required to provide electrical power via the power grid for its operation. It may be operated from a battery or capacitor power supply or may be provided with a solar panel.

The electrical motor can e.g., be a brushed motor or a brushless motor (such as a stepper motor), either of the in-runner or the out-runner type. Motor alternatives provide flexibility in identifying a solution with the best overall characteristics.

Further, the electromechanical actuation unit allows the valve body not only to assume an open or closed position but also any intermediate position. A suitable control of the motor, provided e.g., by an internal or external control unit, further allows to influence the dynamics of the movement of the valve body during opening and/or closing of the valve.

The valve body and/or the seat may comprise more than one seal member.

According to one embodiment of the present invention, the mechanical conversion unit includes a lead screw cooperating with a nut element. Such a conversion unit is inexpensive and can easily be scaled to meet the actual requirements.

For example, the output portion may comprise the nut element. In this case, the nut element is moved in the axial direction by a rotation of the lead screw which in turn is provided-directly or indirectly—by the electrical motor. However, it is also conceivable to provide an axially movable screw and hold the nut element in an axially fixed position.

According to one embodiment, at least one first elastic element, e.g., a spring, is provided, that is supported by the valve housing and that acts on the valve body such that a force is exerted on the valve body urging it in the axial direction into the closed position. This force is a biasing force that supports a closing movement of the valve body. This in turn means that less torque has to be provided by the electric motor in order to create a desired closing force during the closing movement of the valve body. Consequently, said motor can be dimensioned smaller and/or the energy needed to actuate the valve is reduced.

According to one embodiment, the valve body is movable relative to the output portion in the axial direction. In other words, the valve body is not fixedly attached to the output portion to allow for the compensation of thermal effects and/or minor inaccuracies of the electromechanical actuation unit, in particular of the operation of the electric motor.

The electromechanical actuation mechanism may comprise at least one second elastic element, e.g., a spring, that is supported by the output portion and that acts on the valve body such that a force is exerted on the valve body urging it in the axial direction away from the output portion. This biasing force helps to effect the above mentioned compensation.

The output portion and the valve body may be coupled by a coupling unit that restricts a relative movement of the output portion and the valve body in the axial direction. The coupling unit may be provided to make sure that the valve body is moved along with the output portion when a maximum allowable spatial separation of these components has been reached, in particular when the vacuum valve is being opened.

In an embodiment comprising both a first and a second elastic element, the first elastic element may have a higher elasticity than the second elastic element in order to obtain the desired valve characteristics.

According to one embodiment, the output portion is held rotationally fixed by a guidance device. The guidance device may comprise a projection cooperating with a guidance slot or groove extending in the axial direction. Alternative guidance concepts may also be employed, e.g., a guiding rail and/or a guidance based on an outer (non-rotationally symmetric) geometry of the output portion.

According to one embodiment, the electric motor and the input portion are drivingly coupled via at least one reduction drive device. Such a reduction drive device allows to optimize the thrust force and actuator linear speed. It may comprise e.g., gears, belts and/or pulley wheels. However, it is also possible to use a direct drive in which an output member of the motor is directly coupled to the input portion of the mechanical conversion unit.

According to one embodiment, the electromechanical actuation unit comprises at least one locking device and/or locking feature to lock the output portion or the valve body in a desired axial position. A locking feature may be provided by the mechanical conversion unit or—if present—by the reduction drive device. For example, the mechanical conversion unit and/or the reduction drive device have self-locking properties, e.g., due to the specific design of its mechanical components. However, it is also conceivable that more than one locking devices or features are provided to obtain design alternatives for improving packaging, cycle life and energy efficiency. Locking methods include mechanical, electrical, and electromechanical concepts. The electrical motor may also be used as a locking device, then acting as electrical locking device. An electric clamping break is an example for an electromechanical locking device.

Self-locking concepts are associated with a number of particular advantages, such as a reduced time average power consumption and reduced wear of the electric motor, the conversion unit of the valve and the associated control units (electronics). In particular, the electric motor can be put into a stand-by mode or even be shut down completely in case the electromechanical actuation unit is in a self-locked state. Specific holding breaks or an active control of the motor are also obsolete in this case. A further benefit is also that the valve is maintained in the current state during a power interruption, e.g., in an open, closed or intermediate position of the valve body.

According to one embodiment, a position sensor is provided to detect the position of the output portion and/or the valve body. Such a sensor allows to provide a closed-loop control as the data provided by said sensor may be used to control the electric motor. The sensor may be an encoder, and optical sensor, sensor based on the Hall-effect or any other suitable sensor.

Information about the position of the output portion and/or the valve body allows to determine and—if necessary—to adapt the dynamics of electromechanical actuation unit by controlling the electric motor accordingly. It is also easily possible to place the valve body into desired intermediate positions to control the gas flow dynamics in the vacuum system, e.g., to influence, suppress or enhance pressure-time profiles, pressure spikes, gas velocity, flow induced debris generation and movement and pump inlet pressure.

It is also possible to provide an open-loop control of the motor. For example, the actuation unit comprises a stepper motor including a step-counter. The data provided by the counter is an indication for the actual position or state of the output portion.

According to a second aspect of the present invention a vacuum valve for medium-, high- or ultra-high vacuum systems is provided, the vacuum valve comprising a valve housing defining a passage connecting a first and a second opening of the valve housing, a valve body and a complementary seat disposed in the passage, the valve body and/or the seat comprising a seal member and the valve body being movable in a linear axial direction between an open position and a closed position, wherein the valve body cooperates with the seat in the closed position so as to close the passage of the vacuum housing, and an actuation unit for actuating the valve body, the seal member having, in a cross-section perpendicular to the first opening, a non-circular geometry and/or being hollow and/or having a PTFE material or coating and/or comprising a fluoroelastomer material or coating. Hollow, coated and/or fluoroelastomer material containing seal members may have circular geometry.

The use of such a seal member that can be compressed with relatively low forces and/or that provides adequate sealing properties when a relatively low force is acting on it ("low force seal") helps to reduce the energy needed to actuate the valve. It is possible to combine the concept in accordance with the second aspect of the invention with a vacuum valve in accordance with the first aspect of the invention, and vice versa.

According to an embodiment, a first and a second seal member are provided, wherein the first seal member is fixed to the valve body and the second seal member is fixed to the housing. The first and second seal member may be arranged such that they are in contact during closure of the valve. In this embodiment, when the valve body moves into the closed position, both seal members compress into each other. Seal-to-seal compression provides in most cases at a given compression force a more reliable sealing than seal-to-metal compression. Or in other words, lower forces are needed to obtain an adequate sealing of the valve.

The first and second seal member may be fixed to the corresponding component by vulcanization. The seal member may be a coating of PTFE and/or fluoroelastomer material and the valve body and/or on the seat.

A vacuum valve according to the first and/or second aspect of the present invention may comprise an actuation unit that comprises an energy storage unit for providing electrical energy to the electric motor. As the concepts according to the present invention lead to valves with reduced energy consumption, suitable energy storage units (e.g., battery packs) allow to operate the electric motor for substantial time without needing to connect it to the power grid. If a control unit provided for controlling the motor and/or monitoring the status of the valve does not have a wired connection (e.g., a wireless data connection may be envisaged), the operation of the valve may be entirely cordless.

According to a third aspect of the present invention a method for operating a vacuum valve, in particular in accordance with the embodiments described above, is provided, the vacuum valve comprising a valve housing defining a passage connecting a first and a second opening of the valve housing, a valve body and a complementary seat disposed in the passage, the valve body and/or the seat comprising a seal member and the valve body being movable in a linear axial direction between an open position and a closed position, wherein the valve body cooperates with the seat in the closed position so as to close the first opening gas-tightly, and an electromechanical actuation unit for actuating the valve body, the actuation unit comprising an electric motor and a mechanical conversion unit with an input portion drivingly connected with the electric motor and an output portion drivingly connected with the valve body, wherein the mechanical conversion unit converts a rotational output of the electrical motor into a linear movement of the output portion to move the valve body in the axial direction, wherein the electric motor is operated during a movement of the valve body into the closed position such that a velocity of the valve body is reduced before and/or during a contact between the valve body and the seat.

In particular, if the seal member is provided on the valve body, the velocity is reduced before the seal member contacts the seat. In case the seal member is provided on the seat, the velocity may be reduced before the valve body contacts the seal member. In case a seal member is provided on both the seat and the valve body, the velocity of the valve body may be reduced before the seal members contact each other.

Figuratively speaking, the reduction of the speed of the valve body provides for a "soft landing" of the valve body in the complementary seat. A slowed approach of the valve body reduces the stress exerted on the seal member and thus also the induced wear. Further, the generation of vibrations during closure of the valve is minimized when choosing an appropriate velocity profile. This in turn also reduces the generation and/or transport of fine debris particles in the valve which could cause severe problems when being introduced into the vacuum system.

According to one embodiment of the method, the electric motor is operated such that the movement of the valve body from the open to the closed position takes longer than the movement of the valve body from the closed to the open position. In particular, the electric motor is operated such that a compression of the seal member during the movement of the valve body into the closed position takes longer than the decompression of the seal member during the movement of the valve body out of the closed position.

When opening the valve, the problems of generating vibrations and/or causing stress in the seal member and/or the seat and/or the valve body are markedly less pronounced. It is therefore possible to open it faster than closing it, thereby improving the dynamic characteristics of the valve. This holds especially true for the decompression of the seal member.

According to an embodiment of the method, the electric motor is operated in a closed position of the valve body such that a force acting on the seal member does not fall under a predetermined threshold value. This measure makes sure that the valve is reliably closed. The force acting on the seal member may be determined on the basis of data provided by at least one of a force, strain or temperature sensor. In particular, the data provided by a suitably placed force or strain sensor might be used to directly determine the force acting on the seal member. An indirect determination of the force is also possible, e.g., by estimating the force on the basis of a temperature of the valve housing, the seat, the actuation unit and/or the valve body. According to an embodiment, the force acting on the seal member is determined on the basis of an operating parameter of the electric motor. Such an indirect determination of the force may be based on measured motor current or voltage data. For example, the current required for rotation of the motor for a certain angle (e.g., an angle of less than) 5° may be used for estimating the force acting on the seal member, as the current is in essence proportional to the force acting on the seal member.

Other sensors that can optionally be provided to monitor the state of the vacuum valve may be the source of data to determine or estimate the above-mentioned force. The threshold value may be a fixed value or may be determined on the basis of operating parameters of the valve and/or the vacuum system.

DESCRIPTION OF THE PREFERRED EMBODIMENTS

Figure 1:
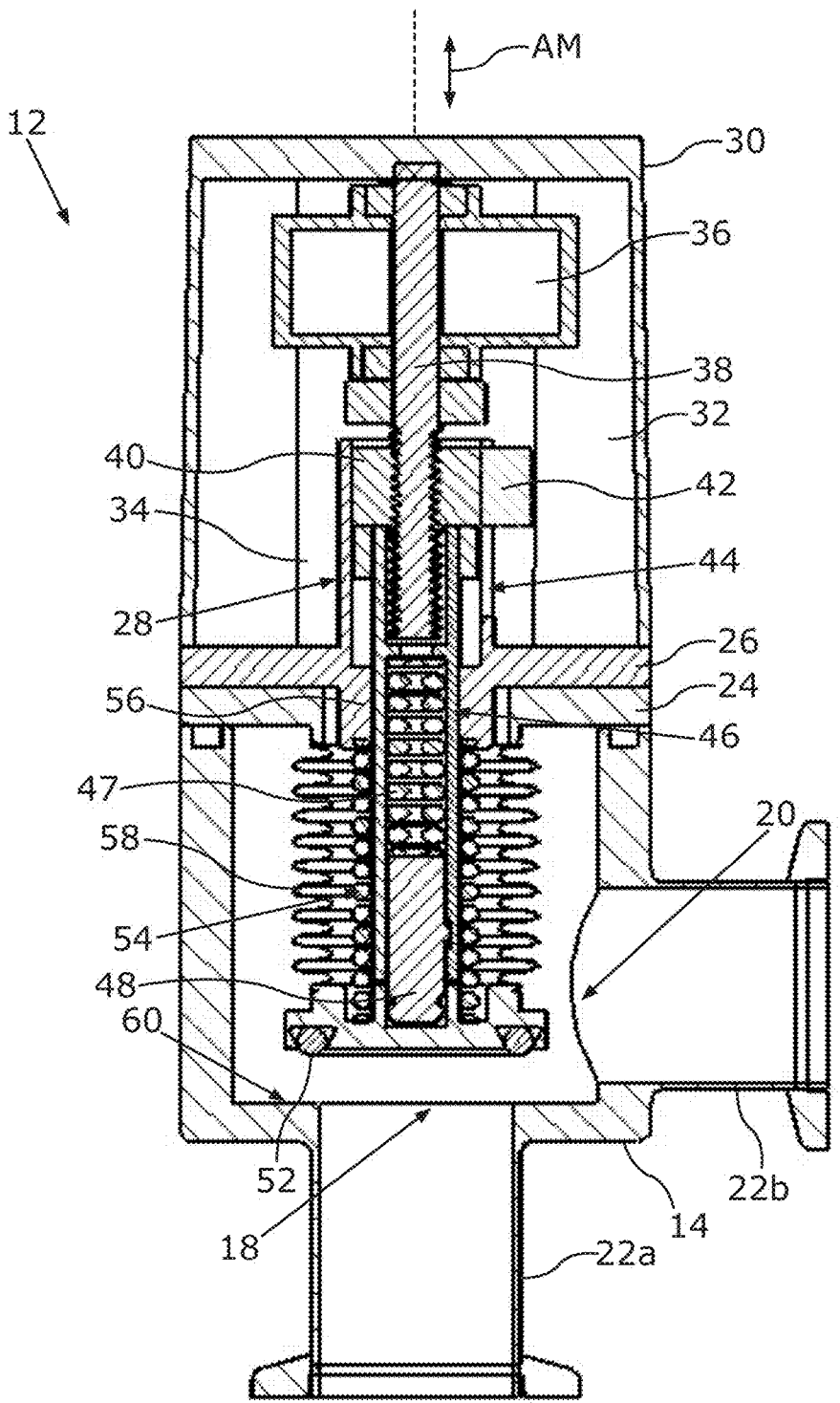
FIG. 1 shows a first embodiment of the vacuum valve in a cross-section.
Figures 2, 3:
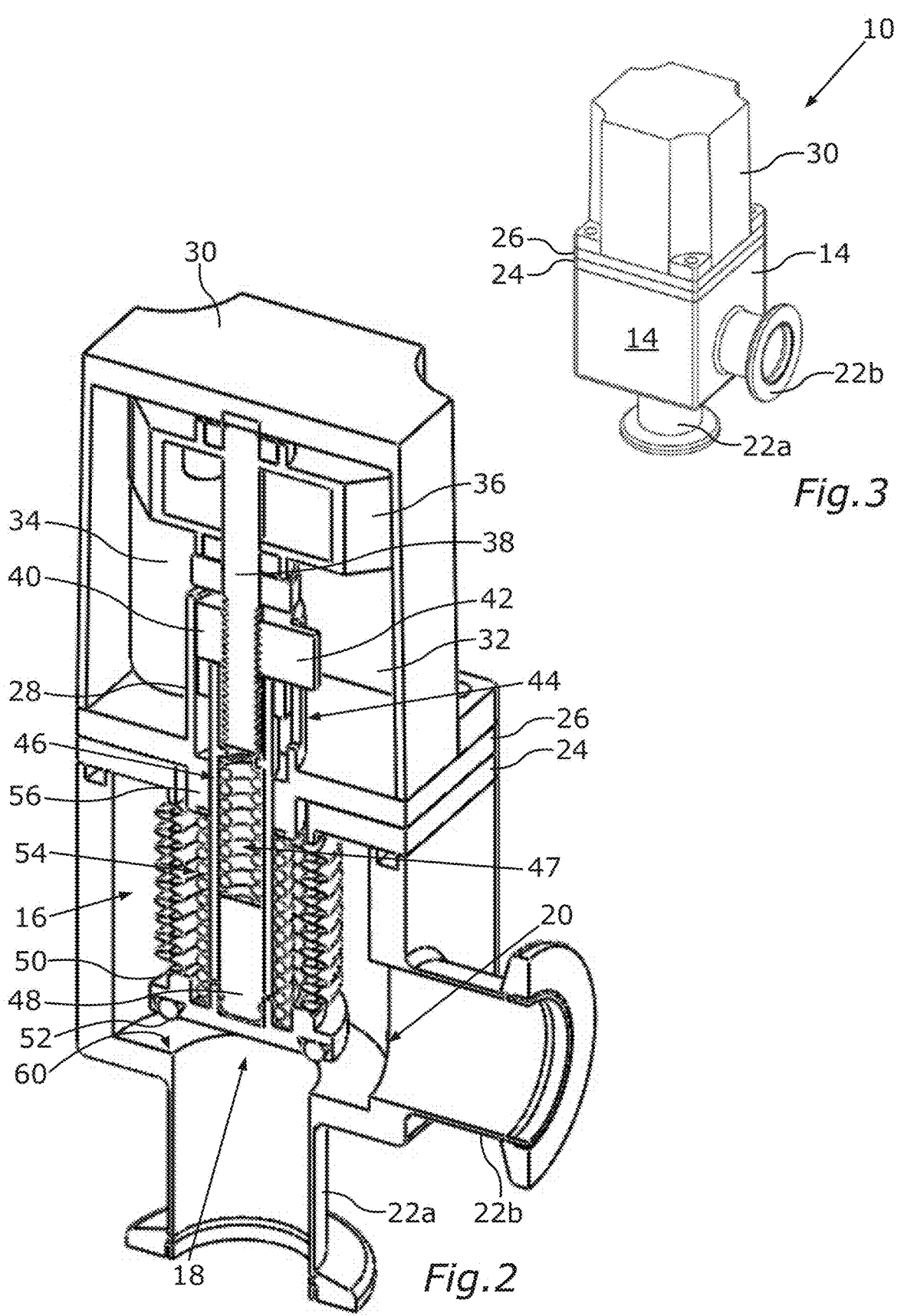
FIG. 2 shows a cross-section of the first embodiment in a perspective view.
FIG. 3 shows the first embodiment in a perspective view.

FIGS. 1, 2 and 3 show a vacuum valve 10 with a housing 12. Housing 12 comprises a bottom member 14 defining a first chamber 16 having a first opening 18 and a second opening 20. Both openings 18, 20 are connected with flange sections 22a, 22b which allowed to integrate the vacuum valve 10 into a medium-, high- or ultra-high vacuum system. The upper side of chamber 16 is covered by wall element 24 which in turn abuts a wall portion 26 of a guidance device 28. Said wall portion 26 forms together with a cover element 30 a second chamber 32. In other words, multipartite housing 12 defines two chambers 16, 32 which—as it is described below-house a valve body (poppet 50) for sealing opening 18 and the key components needed for its actuation, respectively. Chamber 16 essentially functions as a passage between openings 18, 20.

Second chamber 32 houses an electric motor 34 which is drivingly connected via a reduction drive 36 with a lead screw 38. Reduction drive 36 may comprise e.g., a spur gear, a worm gear and/or a planetary gear. Lead screw 38 cooperates with a nut 40 so that when electric motor 34 is active and causes a rotation of lead screw 38, nut 40 will move axially (movement AM in an axial direction) as a projection 42 of nut 40 engages in an axial slot 44 of guidance device 28 thereby preventing a rotation of nut 40.

Nut 40 is fixedly connected to a sleeve 46. Sleeve 46 is provided with a first spring element 47 supported by an interior shoulder of sleeve 46 and acting on a tip element 48 which in turn contacts a poppet 50 provided with a seal 52.

Seal 52 may e.g., be a conventional O-ring or a low force seal as described above and further below.

A second spring element 54 is supported by an axial projection 56 of guidance device 28 projecting through an opening in wall element 24 into first chamber 16. Second spring element 54 acts on poppet 50 urging it downwardly towards opening 18. It surrounds a lower part of sleeve 46 in a radial direction and is in turn surrounded by a bellows 58 separating it from the interior of first chamber 16.

To close valve 10, electric motor 34 is activated driving lead screw 38. The rotation of lead screw 38 provokes an axial movement of nut 40 in a downward direction thereby also pushing sleeve 46 downwardly. This movement is transferred via first spring element 47 and tip element 48 on poppet 50 which is not fixedly connected to sleeve 46. This movement is supported by precompressed second spring element 54. Thus, the force provided by said spring element 54 acts in parallel to the thrust exerted on poppet 50 by the lead screw mechanism 38, 40 that converts a rotation of lead screw 38 into an axial translation of components 40, 46, 47, 48 and 50. Thus, second spring element 54 reduces the torque needed to create said axial translation and the energy consumption of electric motor 34 is reduced. A further benefit is that electric motor 34 can be dimensioned relatively small, in particular if reduction drive 36 is chosen appropriately.

When seal 52 contacts a seat 60 surrounding opening 18, its compression sets in and the process of sealing opening 18 starts. At a given point the compression of seal 52 stagnates and poppet 50 stops moving in the axial direction. The poppet 50 is now in its closed position. As a clearance is provided between poppet 50 and sleeve 46, it is unproblematic if electric motor 34 still runs for a short time. This only causes a reduction of said clearance and a further compression of first spring element 47.

If an open-loop control of electric motor 34 (e.g., a stepper motor) is provided, small inaccuracies in the motor control can be compensated by that clearance. Of course, a position sensor may be provided that monitors the position of any of components 40, 46, 47 and 50 to be able to provide a closed-loop control of electric motor 34.

In case the lead screw mechanism 38, 40 and/or the reduction drive 36 have a self-locking design, no energy is needed to hold poppet 50 in the closed position. Spring elements 47, 54 press poppet 50 against seat 60. In this situation, the above-mentioned clearance also compensates differential thermal expansion and/or stress relaxation of the components of the valve 10.

In order to open valve 10, lead screw 38 is rotated by an appropriate control of electric motor 34 in the opposite direction thereby provoking sleeve 46 fixed to nut 40 to move upwards. In the beginning, poppet 50 is still pressed downwardly by spring elements 47, 54. However, with the retraction of sleeve 46 the clearance between sleeve 46 and poppet 50 is enlarged and the force provided by first spring element 47 acting on poppet 50 is reduced. A coupling mechanism described in more detail below couples poppet 50 to sleeve 46 when a maximum clearance is achieved. Poppet 50 then moves upwardly together with sleeve 46 against the force exerted by spring element 54. It can be moved until reaching an end position defining a "fully open" state. However, any desired intermediate position between the closed position and the fully open position can be assumed by poppet 50.

Figure 4:
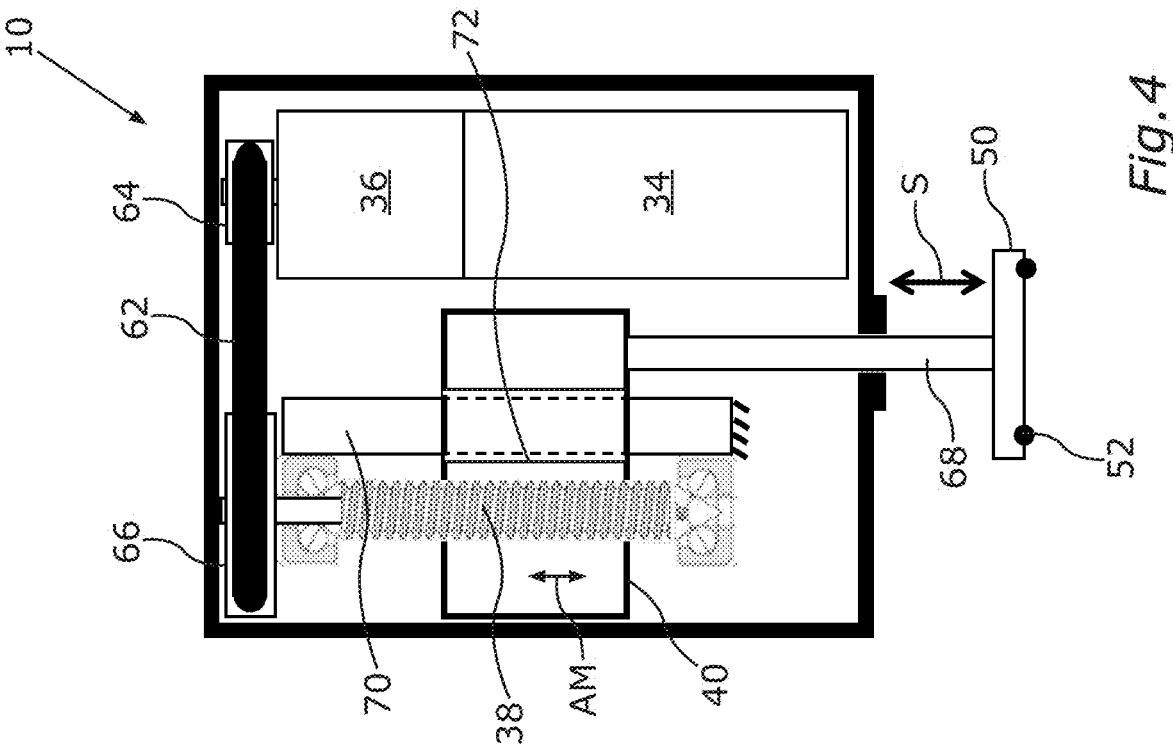
FIG. 4 shows a second embodiment of the vacuum valve schematically.

FIG. 4 shows schematically a second embodiment of the vacuum valve 10. Electric motor 34 is arranged coaxially with reduction drive 36 which is in turn connected via a belt 62 and pulleys 64, 66 with lead screw 38. Lead screw 38 cooperates with nut 40 which is fixedly connected with a rod 68 carrying poppet 50 with seal 52. Axial guidance is provided in this embodiment by guide element 70 projecting through a guide opening 72 in nut 40. Figuratively speaking, guide element 70 functions as a guide rail. Details regarding chamber 16 are omitted for clarity.

In this arrangement, a stroke S of the poppet is parallel to an axial movement AM of nut 40 during operation of valve 10. However, both stroke S and axial movement AM are movements in an axial direction.

Figure 5:
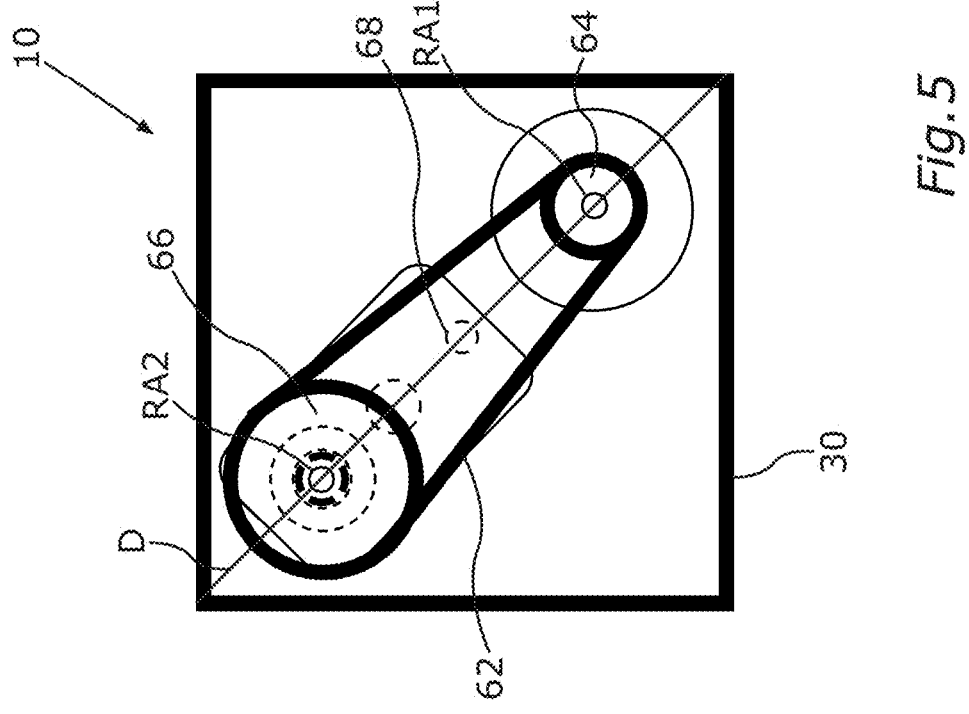
FIG. 5 shows a schematic top view of the second embodiment.

FIG. 5 shows in a top view that a rotational axis RA1 of pulley 64 (and of motor 34), a rotational axis RA2 of pulley 66 and lead screw 38 and an axial projection of rod 68 are disposed essentially on a diagonal D of cover 30. This arrangement is simple and compact.

Figure 7:
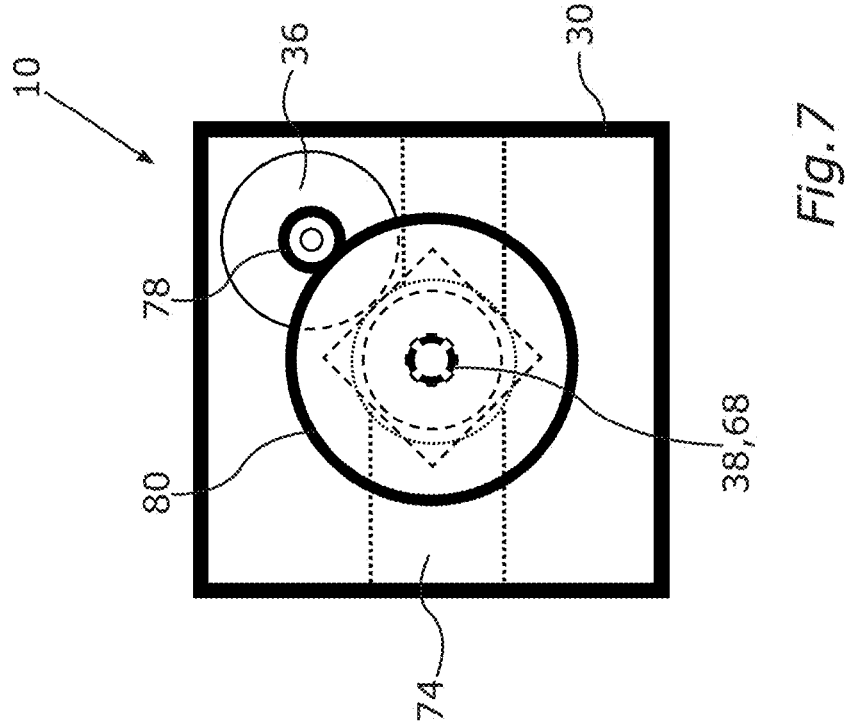
FIG. 7 shows a schematic top view of the third embodiment.
Figure 6:
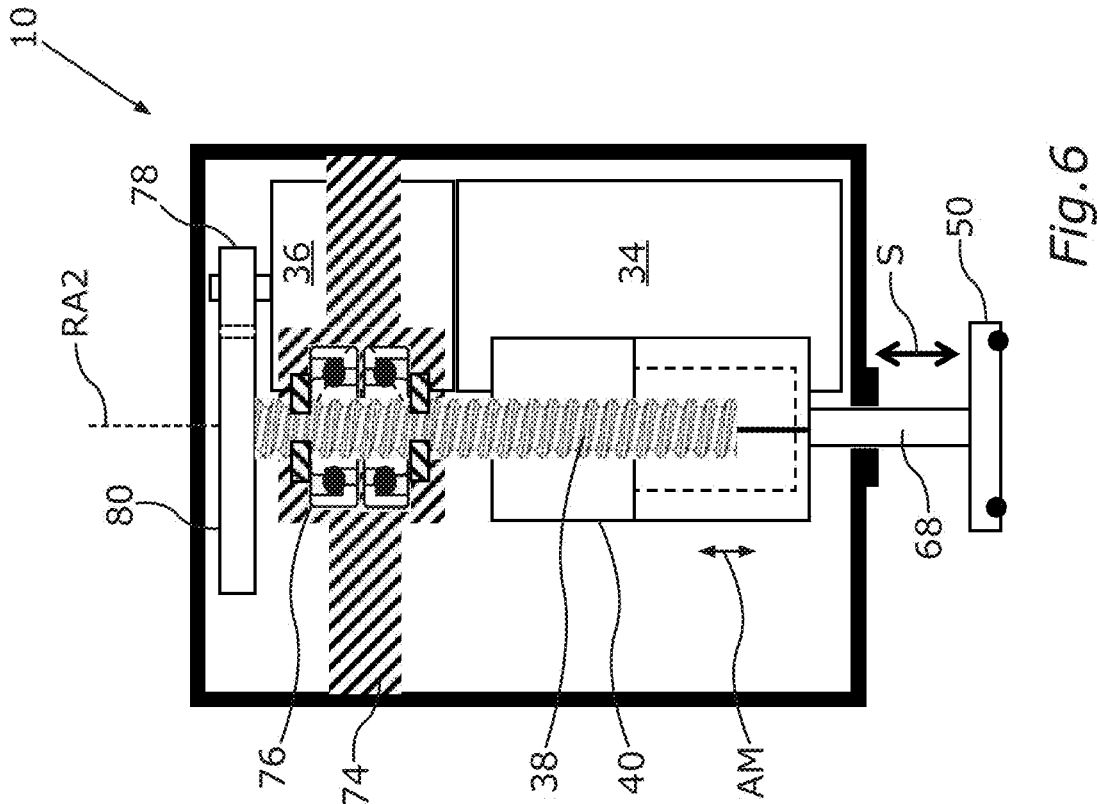
FIG. 6 shows a third embodiment of the vacuum valve schematically.

An alternative compact arrangement is shown in FIGS. 6 and 7. Lead screw 38 is held by a bearing support 74 comprising bearings 76. It is driven by electric motor 34 connected to reduction drive 36 that in turn drives an output gear 78 meshing with an input gear 80 that is fixed to lead screw 38. Lead screw 38 cooperates with nut 40 that is axially movable but rotationally fixed. Nut 40 is connected by rod 68 to poppet 50. In this embodiment, stroke S, axial movement AM and rotational axis RA2 of input gear 80 and lead screw 38 are coaxially arranged.

Figure 8:
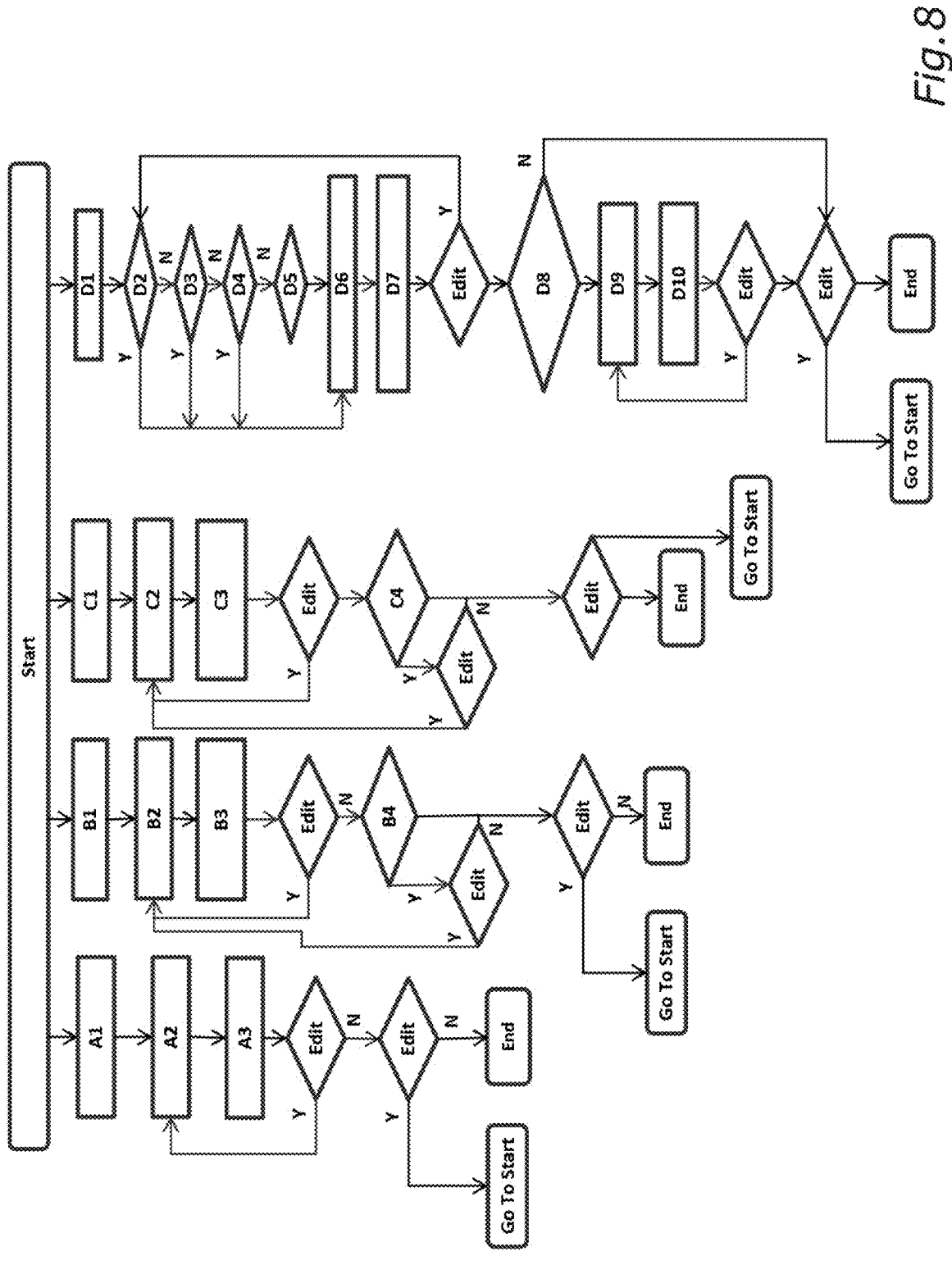
FIG. 8 shows a flowchart visualizing approaches how to optimize the design of a vacuum valve.

FIG. 8 shows a flowchart to visualize exemplary approaches how to optimize a design of a vacuum valve according to the present invention and to adapt it to the requirements of the market. Important goals are, aside to energy efficiency, e.g., optimized flow conductance, optimized actuation motion and dynamics, compact size, low impact velocities during closure of the valve, temperature stability, reliable self-locking properties, reproducible duty-cycles. Non-performance related issues such as packaging, costs and manufacturability may also be considered during optimization of the valve.

The leftmost flow requires as an input A1 the desired flow conductance through the valve. Suitable parameters as e.g., poppet or seal diameter and poppet stroke are chosen (A2) which leads to an actual flow conductance (A3). The parameters may be edited in order to change A3.

The next flow to the right requires as an input of desired the seal material (B1). Then parameters regarding further properties of the seal, e.g., its diameter, cross-section, elasticity, are chosen in step B2 as well as parameters describing how it is held (e.g., geometry of a groove in which the seal is disposed, that influences the response due to relative thermal expansion). This information leads to further insights as regards the actual squeeze force of the seal to expected and/or to be exerted (B3). In response to this information, the above-mentioned parameters may be edited. This allows to optimize the properties of the first spring element 47 (B4).

The next flow to the right requires as an input e.g., the desired actuation profiles for linear motion and thrust of the poppet 50, the desired torque and rotational speed and the desired self-locking force (C1). Relevant parameters are e.g., the lead screw diameter and/or the characteristic friction between the lead screw and the nut (C2). This leads-inter alia—to the actual linear motion and the thrust response for drive torque and rotational speed of the components involved. Insights are further gained into the actual squeeze force and the actual self-locking force (C3). This allows to optimize the properties of the second spring element 54 (C4).

The rightmost flow has as constraint the desired motor type (D1), such as brushed motor (D2), stepper motor (D3), in-runner (D4) or out-runner (D5). Relevant parameters are e.g., the motor torque, the provided rotational speed and the parameters regarding and/or defining duty-cycles (D6). This leads to the actually required or to be expected values of the actual "Power In" (D7). The selection of the suitable motor can be optimized on the basis of the relevant parameters.

In D8 it has to be decided if a reduction drive or an equivalent is needed or desirable. A relevant parameter here is the reduction ratio (D9) which leads to the actual torque and rotational speed provided to actuate the valve and the actual self-locking force that can be expected (D10).

It should be stressed that the optimization flows described above are of exemplary nature only. Additional and/or modified optimization approaches may be adopted. The sequence in which the optimization flows are performed can be chosen freely.

Figure 9:
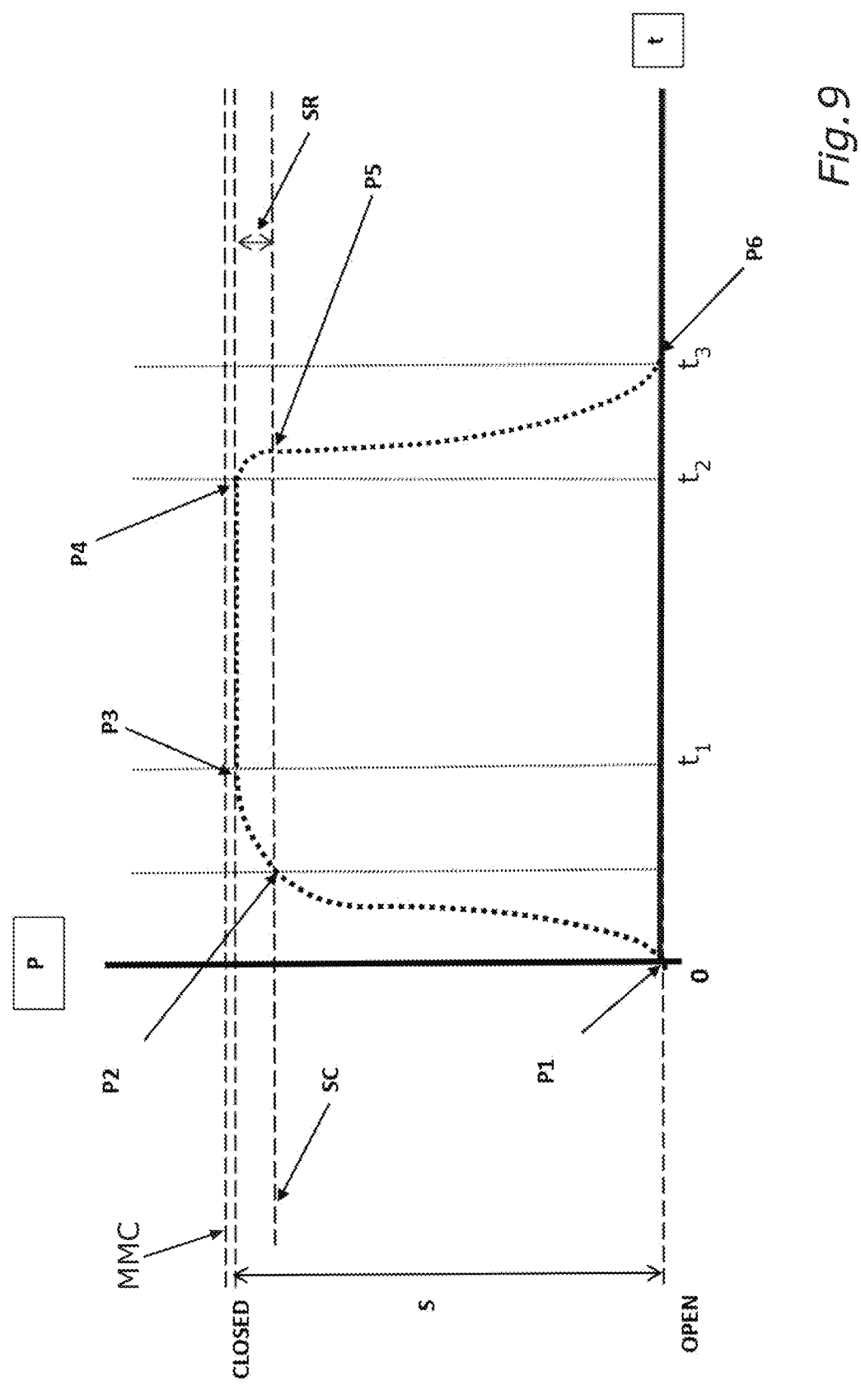
FIG. 9 shows a first embodiment of a method to operate a vacuum valve.

FIG. 9 shows an exemplarily duty-cycle of the vacuum valve according to the present invention in a position (P) versus time (t) diagram. At t=0, poppet 50 of the valve is in the fully open position (position P1). When actuating motor 34, poppet 50 is accelerated and moved relatively quickly towards seat 60. Already before the seal 52 starts to be compressed, the velocity of the poppet 50 is actively reduced. This is reflected be the fact that the slope of the dashed movement curve is reduced before seal 52 contacts seat 60 (seal contact SC, position P2). During compression of seal 52, the velocity of poppet 50 is further reduced until it reaches 0 in the closed position (position P3, time t1). Seal 52 has been compressed by the amount indicated with SR (squeeze range). The valve is suitably controlled so that metal-to-metal contact (MMC) between poppet 50 and seat 60 is avoided. The approach outlined above results in a "soft landing" of poppet 50 during closure of the valve.

If one or more components of the electromechanical actuation unit have self-locking properties, e.g., the lead screw mechanism 38, 40 and/or the reduction drive 36, keeping the poppet 50 in the closed position does not require providing electric energy to motor 34.

The opening of the vacuum valve starts at t2 (P4). As already pointed out, the problems of generating vibrations and/or causing stress in the seal member 52 and/or the seat 60 and/or the valve body 50 are markedly less pronounced when opening the valve than during closure. Poppet 50 can therefore be accelerated rapidly. Decompression of seal 52 consequently occurs much more quickly than its compression.

In the embodiment show, poppet 50 has already reached its maximum velocity when seal 52 loses contact with seat 60 of (position P5). It is further moved away from seat 60 until reaching the fully open position again (P6 at t3).

It can be taken from the above explanations that the duty-cycle of the valve according to the present invention can be asymmetrical as regards opening and closing. In the example described above, closing the valve (0 to t1) takes longer than opening it (t2 to t3). This concept can be readily implemented by the electromechanical actuation unit of the vacuum valve according to the present invention, as such an actuation unit allows to control the position and the dynamics of the valve body/poppet very precisely. It is also possible to design for each application suitable position-time profiles and/or thrust profiles.

Figure 10:
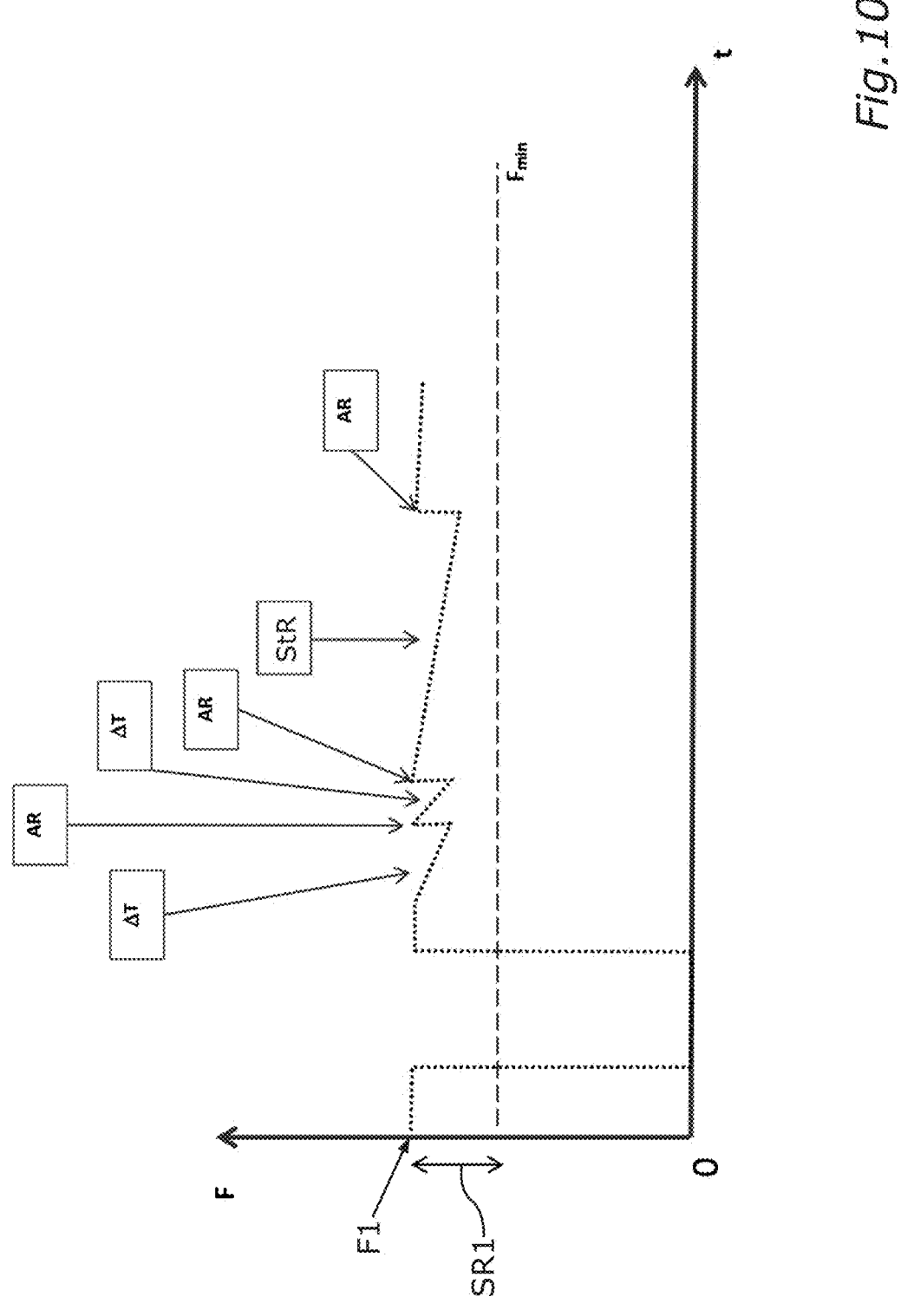
FIG. 10 shows a second embodiment of a method to operate a vacuum valve.

FIG. 10 shows effects occurring during a closed state of the valve in a force (F) versus time (t) diagram. The horizontal dashed line shows a minimum thrust force (Fmin) that should be exerted on seal 52 in order to ensure proper sealing. This value lies below the squeezing force F1 that is obtained after a normal or proper closure of the valve. Differential thermal expansion of the components of the valve may lead to a reduction of the thrust or squeeze force (see T). If this effect is detected, e.g., by monitoring the position of poppet 50 or of other components of the actuation unit using suitable sensors, motor 34 can be activated to compensate said effect by a suitable response (see actuator response AR) in order to keep the force in a desired seal squeeze range SR1. Stress relaxation of the mechanical components involved can be another source a reduction of the force of exerted on seal 52 (see StR).

A reduction in energy consumption of the vacuum valve can-independently from the nature of the actuation unit—also be achieved by using so-called "low force seals", i.e., seals that can be compressed suitably by the application of a relatively small force and/or that have sealing properties already at low forces.

Figures 11, 12A, 12B, 13:
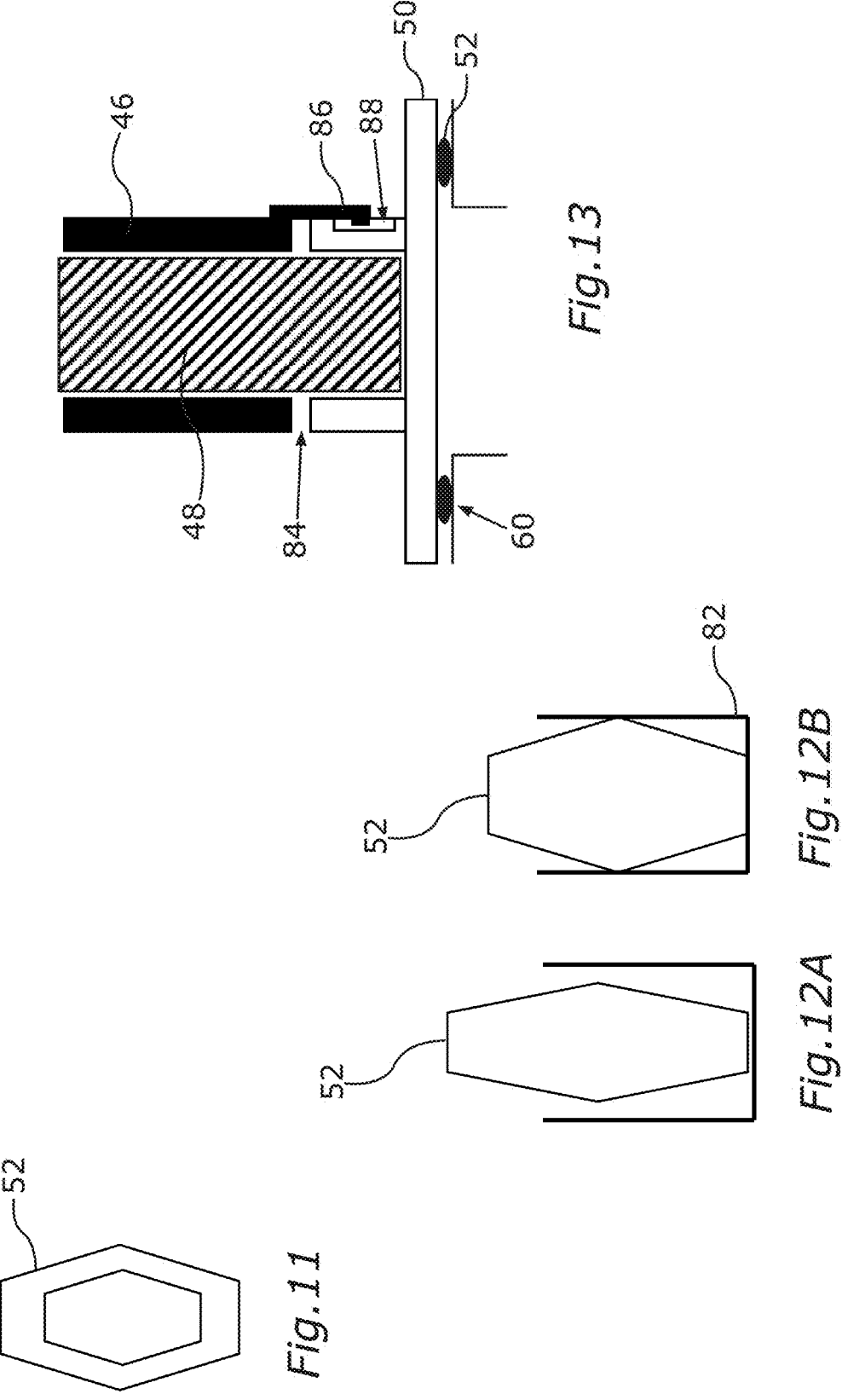
FIG. 11 shows a first embodiment of a low force seal member.
FIG. 12A shows a second embodiment of a low force seal member in an uncompressed situation.
FIG. 12B shows the second embodiment of a low force seal member in a compressed situation.
FIG. 13 shows an embodiment of a coupling unit.
Figure 15:
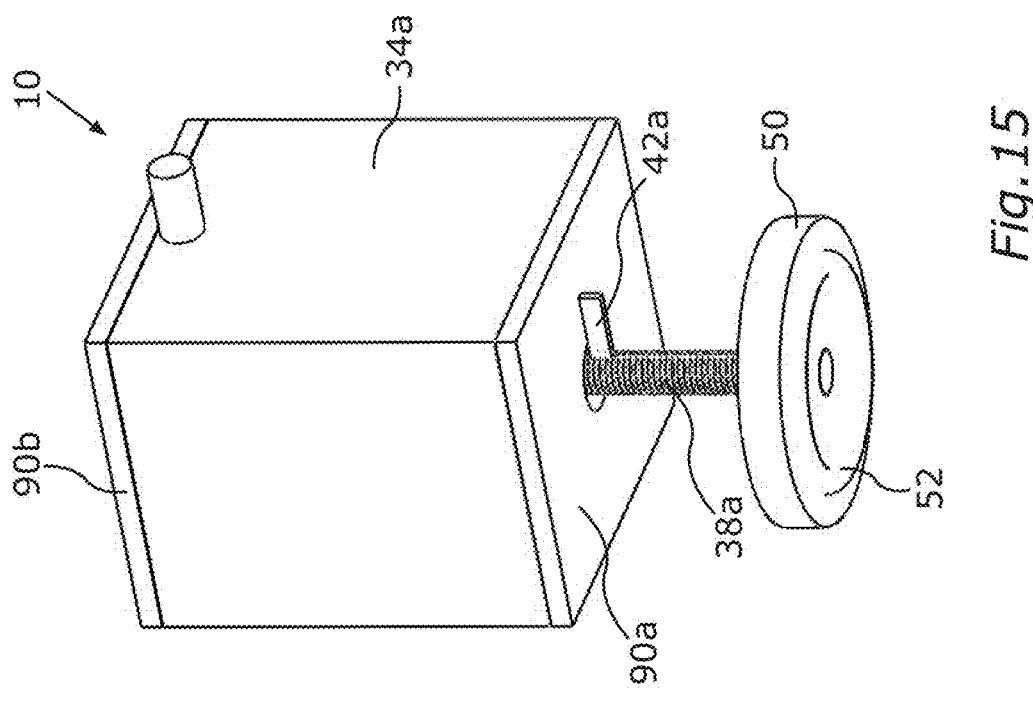
FIG. 15 shows a fourth embodiment of the vacuum valve in a perspective view.

Seals comprising a PTFE material or coating and/or comprising a fluoroelastomer material or coating are examples of such a low force seal. The required properties can also be obtained by departing from a circular cross-section of the seal and choosing non-circular geometries. For example, a diamond-shaped seal 52 as depicted in FIG. 12A (disposed in groove 82, uncompressed) is deformed to a higher degree when a given force is applied (FIG. 12B) than a conventional O-ring of comparable dimensions. This effect is enhanced if seal 52 is at least partly hollow (see FIG. 11). Suitable hollow seals or seals with a softer core can also have geometries that differ from the diamond-shaped geometry shown in FIG. 11.

An exemplary embodiment for mechanism to couple poppet 52 and sleeve 46 is shown in FIG. 13. In an open state of the valve, poppet 50 is pressed away from sleeve 46 by spring-biased tip element 48 so that a clearance 84 between said components is provided. In this state, a projection of a finger 86 of sleeve 46 engages an upper end of a groove 88 of poppet 50 holding it in this position. In a closed state of the valve, the poppet 50 has been moved towards sleeve 46 to compensate e.g., slight inaccuracies of the motor control and/or effects arising from progressive seal compression and/or thermal effects (situation shown in FIG. 13).

During opening of the valve, sleeve 46 moves in an upward direction while poppet 50 is still pressed against seat 60 by spring elements 47, 54. Only when the projection of finger 86 engages the upper end of groove 86, poppet 50 is actively lifted from seat 60.

It should be readily conceivable that there are numerous alternative mechanisms that are able to provide an equivalent or comparable type of coupling.

Figure 14:
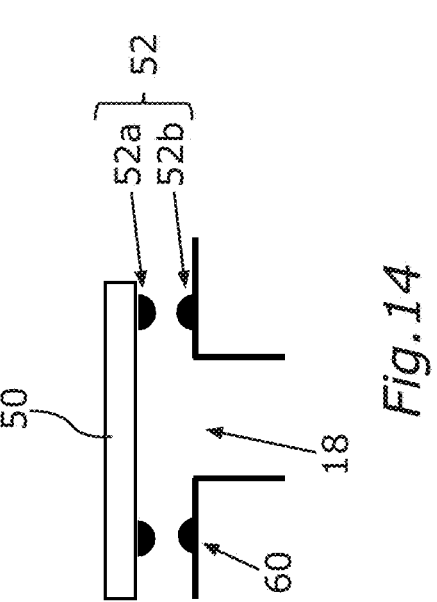
FIG. 14 shows a third embodiment of a low force seal arrangement in an uncompressed situation.
Figure 16:
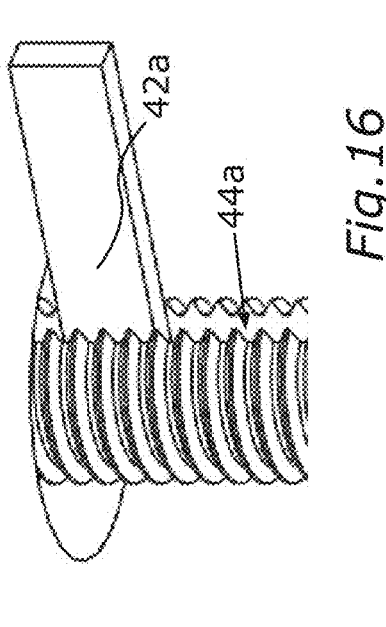
FIG. 16 shows an enlargement of a portion of FIG. 15.
Figure 18:
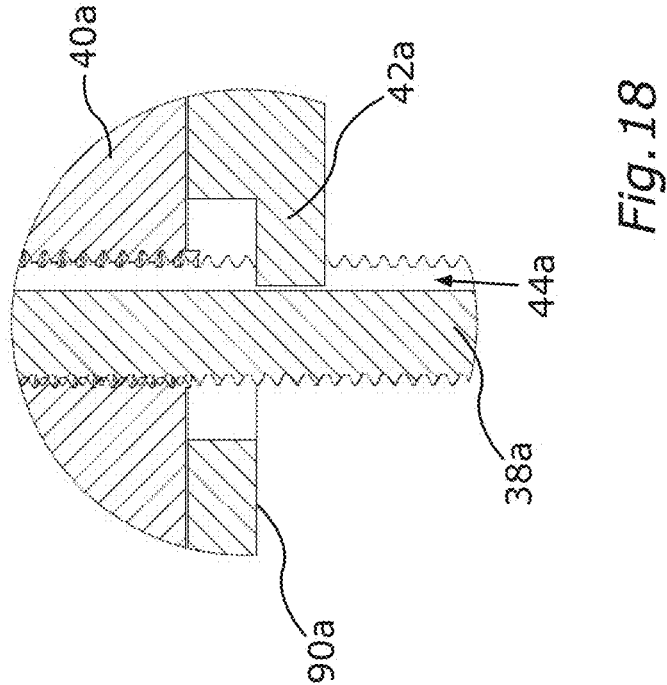
FIG. 18 shows an enlargement of a portion of FIG. 17.
Figure 17:
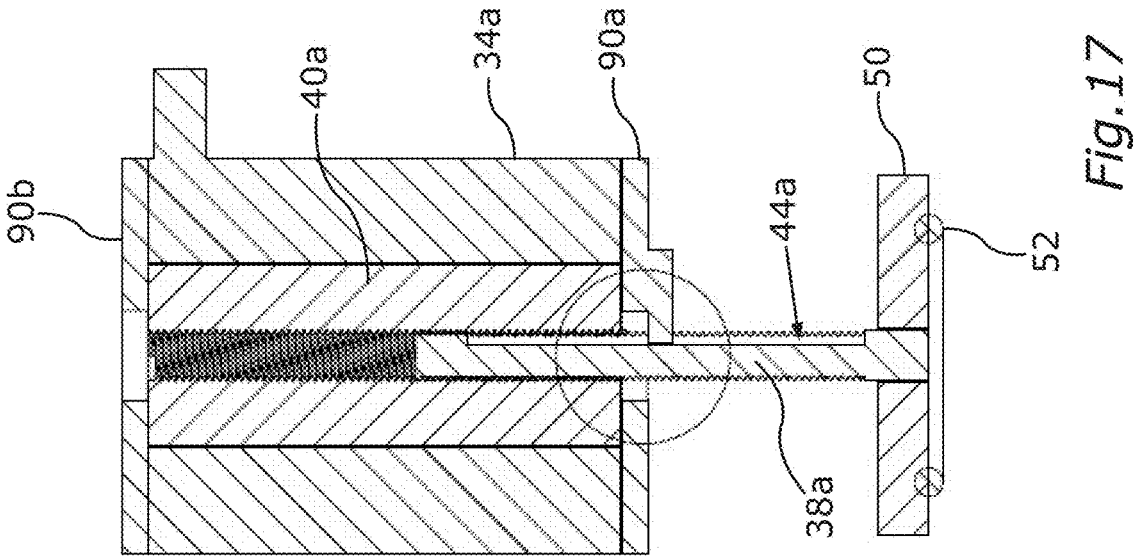
FIG. 17 shows the fourth embodiment in a cross-section.

FIG. 14 shows a further embodiment of a low force seal. It comprises seals 52a, 52b disposed on poppet 50 and seat 60, respectively, in an uncompressed situation. During closure of the valve, seals 52a, 52b are brought into contact with each other and are progressively compressed. As already set forth above, lower forces are needed to obtain an adequate sealing of such a valve than in conventionally arrangements.

FIGS. 15 to 18 show a compact vacuum valve 10 with an axially movable lead screw 38a cooperating with a nut 40a that is held axially fixed. Nut 40a is rotationally driven by electric motor 34a arranged between axial walls 90a, 90b.

Activation of electric motor 34a causes nut 40a to rotate. This in turn leads to an axial movement of lead screw 38a which is prevented from rotation by projection 42a that is fixed to axial wall 90*a* and that engages an axial groove 44*a* of lead screw 38*a*. Functionally equivalent mechanisms are conceivable.

Valve 10 can be operated like the valve embodiments described above. It should be further noted that individual features described in connection with one embodiment can be implemented in the other embodiments, if needed. This holds true in particular for the functionality provided by spring elements 47, 54 described in connection with the embodiment shown in FIGS. 1 and 2.

REFERENCE SIGNS

10 vacuum valve
12 housing
14 bottom member
16 first chamber
18 first opening
20 second opening
22*a*, 22*b* flange section
24 wall element
26 wall portion
28 guidance device
30 cover element
32 second chamber
34 electric motor
36 reduction drive
38, 38*a* lead screw
40, 40*a* nut
42, 42*a* projection
44, 44*a* axial slot or groove
46 sleeve
47 first spring element
48 tip element
50 poppet
52, 52*a*, 52*b* seal
54 second spring element
56 axial projection
58 bellows
60 seat
62 belt
64, 66 pulley
68 rod
70 guide element
72 guide opening
74 bearing support
76 bearing
78 output gear
80 input gear
82 groove
84 clearance
86 finger
88 groove
90*a*, 90*b* axial wall
AM axial movement
S stroke
RA1, RA2 rotational axis
D diagonal P position
t time
SC seal contact
SR, SR1 squeeze range
MMC metal-to-metal contact
StR stress relaxation
F force

We claim:

1. A method for operating a vacuum valve, the vacuum valve comprising
a valve housing defining a passage connecting a first and a second opening of the valve housing,
a valve body and a complementary seat disposed in the passage, the valve body and/or the seat comprising a seal member and the valve body being movable in a linear axial direction between an open position and a closed position, wherein the valve body cooperates with the seat in the closed position so as to close the first opening gas-tightly, and
an electromechanical actuation unit for actuating the valve body, the actuation unit comprising an electric motor and a mechanical conversion unit with an input portion drivingly connected with the electric motor and an output portion drivingly connected with the valve body, wherein the mechanical conversion unit converts a rotational output of the electrical motor into a linear movement of the output portion to move the valve body in the axial direction,
the method comprising:
operating the electric motor during a movement of the valve body into the closed position such that a velocity of the valve body is reduced before and/or during a contact between the valve body and the seat,
wherein the electric motor is operated in the closed position of the valve body such that a force acting on the seal member does not fall under a predetermined threshold value, and
wherein the electric motor is operated in the closed position of the valve body such that the force acting on the seal member does not fall under the predetermined threshold value.

2. The method according to claim 1, wherein the electric motor is operated such that the movement of the valve body from the open to the closed position takes longer than the movement of the valve body from the closed to the open position.

3. The method according to claim 1, wherein the electric motor is operated such that a compression of the seal member during the movement of the valve body into the closed position takes longer than the decompression of the seal member during the movement of the valve body out of the closed position.

4. The method according to claim 1, wherein the operating the electric motor in the closed position includes monitoring current applied to the electric motor and adapting the current such that the force acting on the seal member does not fall under the predetermined threshold value.

* * * * *